(12) United States Patent
Kojima et al.

(10) Patent No.: US 8,835,555 B2
(45) Date of Patent: *Sep. 16, 2014

(54) METHOD FOR PRODUCING EMULSION

(75) Inventors: Kazuhiko Kojima, Ichihara (JP);
Tsutomu Naganawa, Ichihara (JP);
Asao Harashima, Ichihara (JP)

(73) Assignee: Dow Corning Toray Co. Ltd.,
Chiyoda-Ku, Tokyo (JP)

( * ) Notice: Subject to any disclaimer, the term of this patent is extended or adjusted under 35 U.S.C. 154(b) by 568 days.

This patent is subject to a terminal disclaimer.

(21) Appl. No.: 13/140,858

(22) PCT Filed: Dec. 21, 2009

(86) PCT No.: PCT/JP2009/071829
§ 371 (c)(1),
(2), (4) Date: Jun. 20, 2011

(87) PCT Pub. No.: WO2010/074295
PCT Pub. Date: Jul. 1, 2010

(65) Prior Publication Data
US 2011/0257274 A1    Oct. 20, 2011

(30) Foreign Application Priority Data
Dec. 22, 2008    (JP) .................................. 2008-326577

(51) Int. Cl.
*C08J 3/03*       (2006.01)
*C08G 77/46*      (2006.01)

(52) U.S. Cl.
CPC . *C08J 3/03* (2013.01); *C08G 77/46* (2013.01); *C08J 2383/04* (2013.01)
USPC ........... 524/861; 524/730; 524/858; 524/862; 516/55; 528/15; 528/25; 528/31

(58) Field of Classification Search
None
See application file for complete search history.

(56) References Cited

U.S. PATENT DOCUMENTS

| | | | |
|---|---|---|---|
| 4,431,789 A | 2/1984 | Okazaki et al. | |
| 4,520,160 A | 5/1985 | Brown | |
| 4,816,506 A | 3/1989 | Gamon et al. | |
| 5,763,505 A | 6/1998 | Derian et al. | |
| 6,221,934 B1 * | 4/2001 | Stark et al. ..................... | 523/404 |
| 6,710,092 B2 * | 3/2004 | Scher et al. ..................... | 516/59 |
| 6,995,210 B2 | 2/2006 | Bouvy et al. | |
| 2002/0131947 A1 | 9/2002 | Nakanishi | |
| 2003/0105169 A1 | 6/2003 | Lennon | |
| 2005/0008600 A1 | 1/2005 | Nakanishi et al. | |
| 2005/0089697 A1 | 4/2005 | Benayoun et al. | |
| 2007/0238829 A1 | 10/2007 | Paul | |
| 2010/0036062 A1 | 2/2010 | Okawa | |
| 2011/0251417 A1 | 10/2011 | Okawa | |

FOREIGN PATENT DOCUMENTS

| | | |
|---|---|---|
| CN | 1441822 A | 9/2003 |
| CN | 101080440 A | 11/2007 |
| CN | 101084870 A | 12/2007 |
| EP | 0266729 A2 | 5/1988 |
| EP | 1055771 A1 | 11/2000 |
| EP | 2022812 A1 | 2/2009 |
| JP | 57149290 A | 9/1982 |
| JP | S60-156733 A | 8/1985 |
| JP | 61212321 | 9/1986 |
| JP | H02-265926 A | 10/1990 |
| JP | 06145524 | 5/1994 |
| JP | 06-234858 A | 8/1994 |
| JP | 06234918 | 8/1994 |
| JP | 07133354 | 5/1995 |
| JP | 10-176059 A | 6/1998 |
| JP | 10-279688 A | 10/1998 |
| JP | 11148010 | 6/1999 |
| JP | 11148011 | 6/1999 |
| JP | 2000086437 | 3/2000 |
| JP | 2001294666 | 10/2001 |
| JP | 2004339244 | 12/2004 |
| JP | 2005089494 | 4/2005 |
| JP | 2010-144156 A | 7/2010 |
| WO | WO 2007135771 A1 | 11/2007 |
| WO | WO 2010074296 A1 | 7/2010 |
| WO | WO 2010074297 A1 | 7/2010 |

OTHER PUBLICATIONS

English language abstract for JP H02-265926 extracted from the espacenet.com database on Sep. 18, 2013, 17 pages.
English language abstract and machine-assisted English translation for JP 06-234858 extracted from the PAJ database on Sep. 18, 2013, 58 pages.
English language abstract and machine-assisted English translation for JP 10-176059 extracted from the PAJ database on Sep. 18, 2013, 38 pages.
English language abstract and machine-assisted English translation for JP 10-279688 extracted from the PAJ database on Sep. 18, 2013, 88 pages.

(Continued)

*Primary Examiner* — Marc Zimmer
(74) *Attorney, Agent, or Firm* — Howard & Howard Attorneys PLLC

(57) ABSTRACT

The present invention has an objective to easily obtain an emulsion exhibiting superior storage stability, and in particular, an emulsion of a polyorganosiloxane. The present invention provides a method for producing an emulsion characterized by obtaining an emulsion by emulsifying a mixture of an oil and a surfactant, obtained by synthesizing the surfactant in the oil. In particular, the method is suitably used for the preparation of an emulsion of an organopolysiloxane (A) which is usually difficult to be stably emulsified. A silicone-based surfactant (B), and in particular, a silicone-based surfactant having a small degree of polymerization of a siloxane chain such as a trisiloxane is synthesized in an oil. Thereby, an emulsion exhibiting superior storage stability can be produced.

8 Claims, No Drawings

(56) References Cited

OTHER PUBLICATIONS

English language abstract not available for JP S60-156733; however, see English equivalent US 4,520,160. Original Document extracted from the espacenet.com database on Sep. 18, 2013, 7 pages.

English language abstract not available for CN 1441822; however, see English language equivalent US 6,995,210. Original Document extracted from the espacenet.com datebase on Oct. 5, 2012, 35 pages.

English language abstract not available for CN 101080440; however, see English language equivalent US 2007/0238829. Original Document extracted from the espacenet.com database on Oct. 5, 2012, 26 pages.

English language abstract for CN 101084870 extracted from the espacenet.com database on Oct. 5, 2012, 12 pages.

English language abstract for JP 2010-144156 extracted from the espacenet.com database on Oct. 5, 2012, 43 pages.

Margareta Bergh et al., "Atmospheric Oxidation of Poly(oxyethylene) Alcohols. Identification of Ethoxylated Formates as Oxidation Products and Study of Their Contact Allergenic Activity." Journal of Pharmaceutical Sciences, 88, 4 (1999).

Margareta Bergh et al., "Formation of formaldehyde and peroxides by air oxidation of high purity polyoxyethylene surfactants." Contact Dermatitis, 39, 14 (1998).

Anna Bodin et al., "Identification and allergenic activity of hydroxyaldehydes—a new type of oxidation product from an ethoxylated non-ionic surfactant." Contact Dermatitis, 44, 207-212 (2001).

Margareta Bergh et al., "Contact Allergens from Surfactants. Atmospheric Oxidation of Polyoxyethylene Alcohols, Formation of Ethoxylated Aldehydes, and Their Allergenic Activity." Journal of Pharmaceutical Sciences, 87, 276 (1998).

Margareta Bergh et al., "Allergenic Oxidation Products in Ethoxylated Non-Ionic Surfactants." Acta Dermato-Venereologica, 79, 5-26 (1999).

English language abstract for EP 0266729 extracted from the espacenet.com database on Jul. 28, 2011, 9 pages.

English language abstract and translation for JP 06145524 extracted from the PAJ database on Jul. 26, 2011, 28 pages.

English language abstract and translation for JP 06234918 extracted from the PAJ database on Jul. 26, 2011, 30 pages.

English language abstract and translation for JP 07133354 extracted from the PAJ database on Jul. 26, 2011, 31 pages.

English language abstract and translation for JP 11148010 extracted from the PAJ database on Jul. 26, 2011, 40 pages.

English language abstract and translation for JP 11148011 extracted from the Paj database on Jul. 28, 2011, 33 pages.

English language abstract for JP 57149290 extracted from the espacenet.com database on Jul. 28, 2011, 12 pages.

English language abstract for JP 61212321 extracted from the PAJ database on Jul. 26, 2011, 11 pages.

English language abstract and translation for JP 2000086437 extracted from the PAJ database on Jul. 26, 2011, 30 pages.

English language abstract and translation for JP 2001294666 extracted from the PAJ database on Jul. 28, 2011, 37 pages.

English language abstract and translation for JP 2004339244 extracted from the PAJ database on Jul. 28, 2011, 140 pages.

English language abstract and translation for JP 2005089494 extracted from the PAJ database on Jul. 28, 2011, 47 pages.

English language abstract for JP 2010144156 extracted from the espacenet.com database on Jul. 28, 2011, 107 pages.

English language abstract for WO 2007135771 extracted from the espacenet.corn database on Jul. 28, 2011, 159 pages.

International Search Report for Application No. PCT/JP2009I071830 dated Dec. 21, 2009, 3 pages.

International Search Report for Application No. PCT/JP2009I071831 dated Dec. 21, 2009, 3 pages.

International Search Report for Application No. PCT/JP2009I071829 dated Dec. 21, 2009, 3 pages.

\* cited by examiner

METHOD FOR PRODUCING EMULSION

RELATED APPLICATIONS

This application claims priority to and all the advantages of International Patent Application No. PCT/JP2009/071829, filed on Dec. 21, 2009, which claims priority to Japanese Patent Application No. JP 2008-326577, filed on Dec. 22, 2008.

TECHNICAL FIELD

The present invention relates to a novel emulsifying method for producing an emulsion exhibiting superior storage stability.

Priority is claimed on Japanese Patent Application No. 2008-326577, filed on Dec. 22, 2008, the content of which is incorporated herein by reference.

BACKGROUND ART

In general, various types of emulsions in the form of an oil-in-water emulsion or a water-in-oil emulsion have been utilized in wide fields of fiber treatment agents, paints, releasing agents, cosmetics and the like. The aforementioned emulsions are usually produced by emulsifying with various surfactants such as nonionic, anionic, cationic, and amphoteric ionic surfactants, having higher hydrocarbon groups, in many cases.

However, good compatibility between the hydrophobic groups of the aforementioned surfactants and oils, and in particular, polyorganosiloxanes is not necessarily exhibited. For this reason, in many cases of emulsifying oils, and in particular, polyorganosiloxanes, with the aforementioned surfactants, there is a problem in which poor storage stability of emulsions may be obtained if an emulsifier with a high shearing force is not used. Therefore, in order to solve the aforementioned problem, a method for emulsifying with a silicone-based surfactant such as a polyether-modified (poly) siloxane or the like having a siloxane as a hydrophobic group is proposed (see Patent Document 1 to Patent Document 3).

However, even in the case of using the polyether-modified (poly) siloxane, stability of the obtained emulsion was not sufficient yet. Therefore, improvements on stability by means of using together with another surfactant, or using a special emulsifying method, have also been proposed (see Patent Document 4 to Patent Document 7). However, there is a disadvantage in that usage is limited. Therefore, a process for easily producing an emulsion, and in particular, an emulsion of a polyorganosiloxane, exhibiting superior storage stability has been desirable.

Patent Document 1: Japanese Unexamined Patent Application, First Publication No. S61-212321
Patent Document 2: Japanese Unexamined Patent Application, First Publication No. H06-145524
Patent Document 3: Japanese Unexamined Patent Application, First Publication No. 2000-086437
Patent Document 4: Japanese Unexamined Patent Application, First Publication No. H06-234918
Patent Document 5: Japanese Unexamined Patent Application, First Publication No. H07-133354
Patent Document 6: Japanese Unexamined Patent Application, First Publication No. H11-148010
Patent Document 7: Japanese Unexamined Patent Application, First Publication No. H11-148011

DISCLOSURE OF THE INVENTION

Problems to be Solved by the Invention

An objective of the present invention is to easily obtain an emulsion exhibiting superior storage stability, and in particular, an emulsion of a polyorganosiloxane.

Means for Solving the Problems

The objective of the present invention can be achieved by a method for producing an emulsion comprising emulsifying a mixture of an oil and a surfactant, obtained by synthesizing the surfactant in the oil.

The aforementioned oil may be an organopolysiloxane (A).

The aforementioned surfactant is preferably a silicone-based surfactant (B).

As the aforementioned silicone-based surfactant (B), one represented by the following general formula (1):

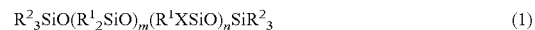
$$R^2{}_3SiO(R^1{}_2SiO)_m(R^1XSiO)_nSiR^2{}_3 \qquad (1)$$

wherein
each $R^1$ independently represents a hydrogen atom or a substituted or unsubstituted monovalent hydrocarbon group;
each X independently represents a group represented by the following general formula (2):

$$-C_aH_{2a}(OC_2H_4)_b(OC_3H_6)_c-OA \qquad (2)$$

wherein
A represents a hydrogen atom, a substituted or unsubstituted monovalent hydrocarbon group, or an organic group represented by $-(CO)-R^3$ in which $R^3$ represents a substituted or unsubstituted monovalent hydrocarbon group;
$(OC_2H_4)$ and $(OC_3H_6)$ are arranged in any one of a random type, a block type, and an alternative type, or a mixed type thereof;
a ranges from 2 to 15;
b ranges from 0 to 100; and
c ranges from 0 to 100,
m ranges from 0 to 50;
n ranges from 0 to 20; and
$R^2$ represents $R^1$ or X, with the proviso that when n is 0, at least one $R^2$ represents X,
can be used. One in which m ranges from 0 to 6 and n ranges from 0 to 3 is preferable.

In addition, as the aforementioned silicone-based surfactant (B), one represented by the following general formula (3):

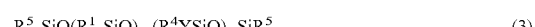
$$R^5{}_3SiO(R^1{}_2SiO)_m(R^4YSiO)_nSiR^5{}_3 \qquad (3)$$

wherein
each $R^4$ independently represents a hydrogen atom or a substituted or unsubstituted monovalent hydrocarbon group;
Y represents a group represented by the following general formula (4):

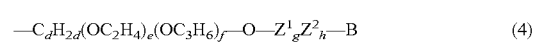
$$-C_dH_{2d}(OC_2H_4)_e(OC_3H_6)_f-O-Z^1{}_gZ^2{}_h-B \qquad (4)$$

wherein
B represents a hydrogen atom, a substituted or unsubstituted monovalent hydrocarbon group, or an organic group represented by $-(CO)-R^3$ in which $R^3$ represents a substituted or unsubstituted monovalent hydrocarbon group;
$Z^1$ represents a divalent group represented by the following general formula (5):

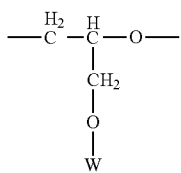

(5)

wherein
W represents a hydrogen atom or a substituted or unsubstituted monovalent hydrocarbon group having no aliphatic unsaturated bond;
$Z^2$ represents a divalent group represented by the following general formula (6):

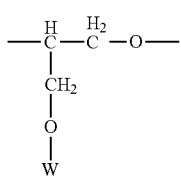

(6)

wherein
W is as described above;
$(OC_2H_4)$ and $(OC_3H_6)$, as well as, $Z^1$ and $Z^2$ are arranged in any one of a random type, a block type, and an alternative type, or a mixed type thereof;
d ranges from 2 to 20;
e ranges from 0 to 100;
f ranges from 0 to 100;
g ranges from 0 to 200;
h ranges from 0 to 200; and $1 \leq g+h$,
m' ranges from 0 to 50;
n' ranges from 0 to 20; and
$R^5$ represents $R^4$ or Y, with the proviso that when n' is 0, at least one $R^5$ represents Y,
can also be used. One in which m' ranges from 0 to 6 and n' ranges from 0 to 3 is preferable.

The aforementioned silicone-based surfactant (B) is preferably produced by subjecting a silicon atom-bonding hydrogen atom-containing siloxane and a terminal double bond-containing compound to a hydrosilylation reaction in the presence of a catalyst for use in a hydrosilylation reaction.

The viscosity of the aforementioned polyorganosiloxane (A) preferably ranges from 50 to 3,000 mPa·s at 25° C.

Effects of the Invention

In accordance with the present invention, an emulsion having a superior storage stability, and in particular, an emulsion of a polyorganosiloxane can be easily produced. An emulsion prepared by means of a preparation method according to the present invention, and in particular, an emulsion of a polyorganosiloxane can exhibit superior stability over time, and can be stably stored for a long period of time. In addition, the method of producing an emulsion of the present invention can be easily carried out by means of a conventional emulsifier.

BEST MODES FOR CARRYING OUT THE INVENTION

The present invention is characterized in that when an oil is dispersed in an aqueous medium or an aqueous medium is dispersed in an oil by means of a surfactant to produce an emulsion, a surfactant is produced in situ in an oil to be emulsified and the aforementioned surfactant is used as it is, together with the aforementioned oil, without using a combination between an oil and a surfactant which has been separately produced. Thereby, for example, improved stability of the emulsion can be obtained, as compared with an emulsion obtained by simply adding a surfactant to an oil from the outside to emulsify them.

The oils to be emulsified in the present invention are not particularly limited, and any types of oils can be used. The origins from the oils are not particularly limited, and the oils may be in the form of a solid, a semi-solid, or a liquid, and may be non-volatile, semi-volatile, or volatile, as long as they are hydrophobic. More particularly, as examples thereof, mention may be made of hydrocarbon oils and waxes, animal or vegetable oils, higher alcohols, ester oils, polyorganosiloxanes and the like. The oils may be used in one type thereof alone or in combination with two or more types thereof.

As examples of hydrocarbon oils and waxes, mention may be made of, for example, ozocerite, squalane, squalene, ceresin, paraffin, paraffin wax, liquid paraffin, pristane, polyisobutylene, polybutene, microcrystalline wax, vaseline, and the like. They may be used in combination with two or more types thereof.

As examples of animal or vegetable fats and oils, mention may be made of, for example, avocado oil, linseed oil, almond oil, ibota wax, perilla oil, olive oil, cacao butter, kapok wax, kaya oil, carnauba wax, liver oil, candelilla wax, beef tallow, neat's-foot oil, beef bone fat, hydrogenated beef tallow, apricot kernel oil, spermaceti wax, hydrogenated oil, wheat germ oil, sesame oil, rice germ oil, rice bran oil, sugar cane wax, sasanqua oil, safflower oil, shear butter, Chinese tung oil, cinnamon oil, jojoba wax, shellac wax, turtle oil, soybean oil, tea seed oil, camellia oil, evening primrose oil, corn oil, lard, rapeseed oil, Japanese tung oil, rice bran wax, germ oil, horse fat, persic oil, palm oil, palm kernel oil, castor oil, hydrogenated castor oil, castor oil fatty acid methyl ester, sunflower oil, grape oil, bayberry wax, jojoba oil, macadamia nut oil, beeswax, mink oil, cottonseed oil, cotton wax, Japanese wax, Japanese wax kernel oil, montan wax, coconut oil, hydrogenated coconut oil, tri-coconut oil fatty acid glyceride, mutton tallow, peanut oil, lanolin, liquid lanolin, reduced lanolin, lanolin alcohol, hard lanolin, lanolin acetate, lanolin fatty acid isopropyl ester, hexyl laurate, POE lanolin alcohol ether, POE lanolin alcohol acetate, lanolin fatty acid polyethylene glycol, POE hydrogenated lanolin alcohol ether, egg yolk oil, and the like. They may be used in combination with two or more types thereof.

As examples of higher alcohols, mention may be made of, for example, lauryl alcohol, myristyl alcohol, palmityl alcohol, stearyl alcohol, behenyl alcohol, hexadecyl alcohol, oleyl alcohol, isostearyl alcohol, hexyldodecanol, octyldodecanol, cetostearyl alcohol, 2-decyltetradecinol, cholesterol, phytosterol, POE cholesterol ether, monostearyl glycerol ether (batyl alcohol), monooleyl glyceryl ether (selachyl alcohol) and the like. They may be used in combination with two or more types thereof.

As examples of ester oils, mention may be made of, for example, diisobutyl adipate, 2-hexyldecyl adipate, di-2-heptylundecyl adipate, N-alkylglycol monoisostearate, isocetyl isostearate, trimethylolpropane triisostearate, ethylene glycol di-2-ethylhexanoate, cetyl 2-ethylhexanoate, trimethylolpropane tri-2-ethylhexanoate, pentaerythritol tetra-2-ethylhexanoate, cetyl octanoate, octyldodecyl gum ester, oleyl oleate, octyldodecyl oleate, decyl oleate, isononyl isononanoate, neopentyl glycol dicaprate, triethyl citrate, 2-ethylhexyl succinate, amyl acetate, ethyl acetate, butyl acetate, isocetyl stearate, butyl stearate, diisopropyl sebacate, di-2-ethylhexyl sebacate, cetyl lactate, myristyl lactate, isopropyl palmitate, 2-ethylhexyl palmitate, 2-hexyldecyl palmitate, 2-heptylundecyl palmitate, cholesteryl 12-hydroxystearate, dipentaerythritol fatty acid ester, isopropyl myristate, 2-ethylhexyl myristate, octyldodecyl myristate, 2-hexyldecyl myristate, myristyl myristate, hexyldecyl dimethyloctanoate, ethyl laurate, hexyl laurate, 2-octyldodecyl N-lauroyl-L-glutamate, diisostearyl malate, and the like. As examples of glyceride oils, mention may be made of acetoglyceryl, glyceryl triisooctanoate, glyceryl triisostearate, glyceryl triisopalmitate, glyceryl tri(caprylate/caprate), glyceryl monostearate, glyceryl di-2-heptylundecanoate, glyceryl trimyristate, diglyceryl myristate isostearate, and the like. They can be used in combination with two or more types thereof.

In the present invention, as the oil, a polyorganosiloxane (A) is preferably used. As the aforementioned polyorganosiloxane (A), any one of straight chain, partially branched chain, branched chain and cyclic ones can be used. In general, the straight chain, partially branched chain or branched one is used. As examples of the organic group bonding to the silicon atom, mention may be made of substituted or unsubstituted monovalent hydrocarbon groups. As examples of the substituted or non-substituted monovalent hydrocarbon group, mention may be made of, for example, saturated aliphatic hydrocarbon groups such as a methyl group, an ethyl group, a propyl group, a butyl group, a pentyl group, a hexyl group, a heptyl group, an octyl group, a decyl group, a dodecyl group, and the like; unsaturated aliphatic hydrocarbon groups such as a vinyl group, an allyl group, a hexenyl group, and the like; saturated alicyclic hydrocarbon groups such as a cyclopentyl group, a cyclohexyl group and the like; aromatic hydrocarbon groups such as a phenyl group, a tolyl group, a naphthyl group and the like; and groups in which one or more hydrogen atoms bound to carbon atoms of the aforementioned groups are substituted with a halogen atom such as fluorine or the like, or an organic group containing an epoxy group, a glycidyl group, an acyl group, a carboxyl group, an amino group, a methacryl group, a mercapto group, or the like. The aforementioned polyorganosiloxane (A) may contain a hydroxyl group or an alkoxy group bonding to a silicon atom.

As examples of the aforementioned polyorganosiloxane (A), mention may be made of, for example, α,ω-dihydroxypolydimethylsiloxane; α-hydroxy-ω-trimethylsiloxypolydimethylsiloxane; α,ω-dimethoxypolydimethylsiloxane; α-methoxy-ω-trimethylsiloxypolydimethylsiloxane; α,ω-diethoxypolydimethylsiloxane; α-ethoxy-ω-trimethylsiloxypolydimethylsiloxane; α,ω-di(trimethylsiloxy)polydimethylsiloxane; crosslinked methylpolysiloxanes in which the terminal of the molecular chain is blocked with a silanol group, a methoxy group, an ethoxy group, or a trimethylsiloxy group; and polyorganosiloxanes in which a part of the methyl groups in the aforementioned polyorganosiloxanes is substituted with an ethyl group, a phenyl group, a vinyl group, a 3-aminopropyl group, an N-(2-aminoethyl)-3-aminopropyl group, a 3-methacryloxypropyl group, a 3-glycidoxypropyl group, or a 3-carboxypropyl group. The viscosity of the aforementioned polyorganosiloxane (A) at 25° C. preferably ranges from 5 to 100,000 mPa·s, more preferably ranges from 10 to 10,000 mPa·s, further preferably ranges from 25 to 5,000 mPa·s, and in particular, preferably ranges from 50 to 3,000 mPa·s.

The surfactant used in the present invention is not particularly limited, and any surfactant which can be synthesized in situ in the oil can be used. For example, a polyoxyethylene hydrogenated castor oil can be produced by adding ethylene oxide to a castor oil, and for this reason, this can be used as the surfactant in the present invention. In addition, a glycerol fatty acid ester obtained by carrying out an ester exchange reaction between an ester oil and glycerol utilizing an enzyme can also be used as the surfactant in the present invention. In addition, a silicone-based surfactant can also be synthesized in situ in an organopolysiloxane, and for this reason, this can also be used in the present invention. The aforementioned surfactant is preferably a silicone-based surfactant (B).

As the aforementioned silicone-based surfactant (B), any one can be used as long as the surfactant has a hydrophobic moiety based on a (poly)siloxane and a hydrophilic moiety. Use of at least one selected from the group consisting of polyether-modified (poly)siloxanes, polyglycerol-modified (poly)siloxanes, poly(glycidyl ether)-modified (poly)siloxanes and poly(glycidyl ether)-polyglycerol-modified (poly)siloxanes is preferable.

As the polyether-modified (poly)siloxane, one represented by the following general formula (1) can be used.

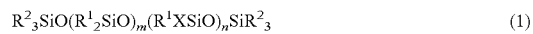
$$R^2{}_3SiO(R^1{}_2SiO)_m(R^1XSiO)_nSiR^2{}_3 \quad (1)$$

wherein
each $R^1$ independently represents a hydrogen atom or a substituted or unsubstituted monovalent hydrocarbon group;
each X independently represents a group represented by the following general formula (2):

$$-C_aH_{2a}(OC_2H_4)_b(OC_3H_6)_c-OA \quad (2)$$

wherein
A represents a hydrogen atom, a substituted or unsubstituted monovalent hydrocarbon group, or an organic group represented by —(CO)—$R^3$ in which $R^3$ represents a substituted or unsubstituted monovalent hydrocarbon group;
$(OC_2H_4)$ and $(OC_3H_6)$ are arranged in any one of a random type, a block type, and an alternative type, or a mixed type thereof;
a ranges from 2 to 15, b ranges from 0 to 100, c ranges from 0 to 100, and b+c is preferably 100 or less; more preferably, a ranges from 2 to 10, b ranges from 1 to 50, c ranges from 1 to 50, and b+c is 50 or less; and further preferably, a is 2 or 3, b ranges from 5 to 30, c ranges from 5 to 30, and b+c is 30 or less;
m ranges from 0 to 50 and n ranges from 0 to 20; preferably, m ranges from 0 to 30 and n ranges from 0 to 15; more preferably, m ranges from 0 to 10 and n ranges from 0 to 7; and further preferably, m ranges from 0 to 6 and n ranges from 0 to 3;
in particular, the case in which m ranges from 0 to 2 and n is 1, and the case in which m is 0 and n is 1 are preferable; and $R^2$ represents $R^1$ or X, with the proviso that when n is 0, at least one $R^2$ represents X.

As the polyglycerol-modified (poly)siloxane, poly(glycidyl ether)-modified (poly)siloxane, and poly(glycidyl ether)-polyglycerol-modified (poly)siloxane, one represented by the following general formula (3) is preferably used.

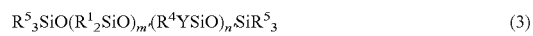
$$R^5{}_3SiO(R^1{}_2SiO)_m(R^4YSiO)_nSiR^5{}_3 \quad (3)$$

wherein
each $R^4$ independently represents a hydrogen atom or a substituted or unsubstituted monovalent hydrocarbon group;
Y represents a group represented by the following general formula (4):

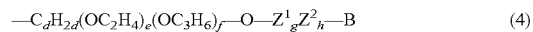
$$-C_dH_{2d}(OC_2H_4)_e(OC_3H_6)_f-O-Z^1{}_gZ^2{}_h-B \quad (4)$$

wherein
B represents a hydrogen atom, a substituted or unsubstituted monovalent hydrocarbon group, or an organic group represented by —(CO)—$R^3$ in which $R^3$ represents a substituted or unsubstituted monovalent hydrocarbon group;
$Z^1$ represents a divalent group represented by the following general formula (5):

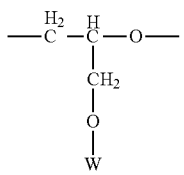

(5)

wherein
W represents a hydrogen atom or a substituted or unsubstituted monovalent hydrocarbon group having no aliphatic unsaturated bond;
$Z^2$ represents a divalent group represented by the following general formula (6):

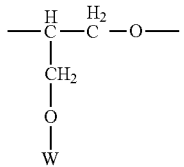

(6)

wherein
W is as described above;
$(OC_2H_4)$ and $(OC_3H_6)$, as well as, $Z^1$ and $Z^2$ are arranged in any one of a random type, a block-type, and an alternative type, or a mixed type thereof;
d ranges from 2 to 20, e ranges from 0 to 100, f ranges from 0 to 100, g ranges from 0 to 200, h ranges from 0 to 200, 1≤g+h, and e+f is preferably 100 or less; more preferably, d ranges from 2 to 10, e ranges from 1 to 50, f ranges from 1 to 50, and e+f is 50 or less; even more preferably d ranges from 2 or 3, e ranges from 5 to 30, f ranges from 5 to 30, and e+f is 30 or less; preferably, g ranges from 1 to 200, h ranges from 1 to 200, and 2≤g+h; more preferably, g ranges from 2 to 200, h ranges from 2 to 200, and 4≤g+h; and further preferably, g ranges from 5 to 200, h ranges from 5 to 200, and 10≤g+h;
m' ranges from 0 to 50 and n' ranges from 0 to 20; preferably, m' ranges from 0 to 30 and n' ranges from 0 to 15; more preferably, m' ranges from 0 to 10 and n' ranges from 0 to 7; and further preferably, m' ranges from 0 to 6 and n' ranges from 0 to 3; and the case of m' ranges from 0 to 2 and n'=1 and the case of m'=0 and n'=1 are, in particular, preferable; and $R^5$ represents $R^4$ or Y, with the proviso that when n' is 0, at least one $R^5$ represents Y.

The usage amount of the aforementioned silicone-based surfactant (B) in the emulsion is not particularly limited. The amount preferably ranges from 0.01 to 50 parts by weight, and more preferably ranges from 0.1 to 30 parts by weight, with respect to 100 parts by weight of the oil.

As a method for producing the aforementioned silicone-based surfactant (B), mention may be made of, for example, as a representative example, a method in which a silicon atom-bonding hydrogen atom-containing siloxane and a terminal double bond-containing compound are subjected to a hydrosilylation reaction in the presence of a catalyst for use in a hydrosilylation reaction.

The silicon atom-bonding hydrogen atom-containing siloxane can be represented by, for example, the following general formula (1') shown below:

(1')

wherein
each $R^6$ independently represents a hydrogen atom, or a substituted or unsubstituted monovalent hydrocarbon group;
m" ranges from 0 to 50 and n" ranges from 0 to 20; preferably, m" ranges from 0 to 30 and n" ranges from 0 to 15; more preferably, m" ranges from 0 to 10 and n" ranges from 0 to 7; further preferably, m" ranges from 0 to 6 and n" ranges from 0 to 3; and, in particular, the case of m"=0, 1 or 2; and n"=1 is preferable;
$R^7$ represents $R^6$ or a hydrogen atom, with the proviso that when n" is 0, at least one $R^7$ represents a hydrogen atom. As examples of silicon atom-bonding hydrogen atom-containing siloxanes of the general formula (1'), mention may be made of, for example, 1,2-dihydrogen-1,1,2,2-tetramethyldisiloxane, 1-hydrogen-1,1,2,2,2-pentamethyldisiloxane, 2-hydrogen-1,1,1,2,3,3,3-heptamethyltrisiloxane, 1,3-dihydrogen-1,1,2,2,3,3-hexamethyltrisiloxane, 1-hydrogen-1,1,2,2,3,3,3-heptamethyltrisiloxane, 1-hydrogen-1,1,2,2,3,3,4,4,4-nonamethyltetrasiloxane, 3-hydrogen-1,1,1,2,2,3,4,4,4-nonamethyltetrasiloxane, and the like. 2-hydrogen-1,1,1,2,3,3,3-heptamethyltrisiloxane is, in particular, preferable.

The terminal double bond-containing compounds are not particularly limited as long as the compounds have an ethylenic double bond or bonds at terminal (s). For example, the compounds represented by the following general formula (2') can be used.

(2')

wherein
A is as described above;
b and c are as described above; and
a' ranges from 0 to 13, preferably ranges from 0 to 8, and is more preferably 0 or 1,
or the compounds represented by the following general formula (4'):

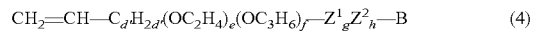

(4)

wherein
B, $Z^1$ and $Z^2$ are as described above;
e, f, g and h are as described above;
d' ranges from 0 to 18, preferably ranges from 0 to 8, and is more preferably 0 or 1.

As examples of the compounds represented by the aforementioned general formula (2'), mention may be made of, for example, monoalkenyl polyethers such as $CH_2=CHCH_2O(C_2H_4O)_{12}H$, $CH_2=CHCH_2O(C_2H_4O)_{13}CH_3$, $CH_2=CHCH_2O(C_2H_4O)_7H$, and the like.

In addition, the compound represented by the aforementioned general formula (4') can be obtained by, for example, subjecting glycidol, glycidyl ether obtained by replacing the hydrogen atom in the hydroxyl group of glycidol with the hydrocarbon group for forming the aforementioned W group, or a mixture of glycidol and the glycidyl ether to a ring-opening (co)polymerization in the presence of an acid or basic catalyst using an aliphatic unsaturated bond-containing alcohol or carboxylic acid such as ethylene glycol monoallyl ether or the like as an initiator. The ring-opening (co)polymerization can be carried out in accordance with a conventional method. When a mixture of the glycidyl ether and glycidol are copolymerized, one corresponding to a random copolymer can be obtained. On the other hand, when one is polymerized and then the other is added to polymerize these, one corresponding to a block copolymer can be obtained. Two or more types of glycidyl ethers can also be used.

In addition, the compound represented by the aforementioned general formula (4') can also be produced by means of a so-called Williamson ether synthesis reaction, which comprises subjecting glycidol to a ring-opening polymerization in the presence of an acid or basic catalyst using the aforementioned aliphatic unsaturated bond-containing alcohol or carboxylic acid as an initiator, subsequently adding a specified amount of an alkali hydroxide to form an alkali-alcholated terminal of a molecular chain, and subsequently reacting with a halogenated hydrocarbon to partially replace hydrogen atoms in the hydroxyl groups with hydrocarbon groups.

As examples of the acid polymerization catalyst, mention may be made of Lewis acids such as $BF_3.OEt_2$, $HPF_6.OEt_2$, $TiCl_4$, $SnCl_4$, sulfuric acid, $PhCOSbF_6$, perchloric acid, fluorosulfuric acid, trifluoroacetic acid, trifluoromethanesulfonic acid and the like, wherein Et represents an ethyl group; and Ph represents a phenyl group. As examples of basic polymerization catalysts, mention may be made of a metal hydroxide such as LiOH, NaOH, KOH, CsOH or the like; an alkali metal such as Li, Na, K, Cs or the like or mercury amalgam thereof; a metal alcholate represented by the following general formula: $ROM^1$, wherein R=alkyl group, and preferably an alkyl group having 1 to 4 carbon atoms, and $M^1$=alkali metal; a metal hydride of which the metal is an alkali metal or an alkaline earth metal; an organometal compound such as n-butyl lithium, t-butyl lithium, potassium pentadienyl, potassium naphthalene, Grignard reagent or the like; and the like. Among these, the alkali metal, metal hydroxide, metal alcholate or organometal compound is preferable due to high activity. In particular, K, KOH, CsOH, potassium hydride, potassium methoxide, potassium isopropoxide, or potassium t-butoxide is particularly preferable as a catalyst having both convenience and increased activity. The amount of the catalyst preferably ranges from 0.01 to 2 molar equivalents, more preferably ranges from 0.03 to 1.0 molar equivalents, and in particular, preferably ranges from 0.05 to 0.8 molar equivalents with respect to one molar equivalent of the functional group.

A solvent may or may not be used. When the reaction system has an extremely increased viscosity or is in the form of a solid or a non-uniform slurry mixture in accordance with the catalyst type, the amount of the catalyst, or the blending amount of glycidol, a suitable solvent is used and a polymerization reaction is carried out therein.

The polymerization temperature may be suitably determined in accordance with polymerization activity of the catalyst used, concentration of the functional group thereof, and the like, and ranges from −78 to 220° C., and more preferably ranges from −30 to 150° C.

At the front or back of $Z^1$ and $Z^2$ of the compound represented by the aforementioned general formula (4'), a small amount of an ethyleneoxy group and/or a propyleneoxy group may be present. The aforementioned groups are unstable with respect to oxidation and are easily decomposed to give a carbonyl functional decomposed product. For this reason, the amount of the aforementioned groups is preferably not more than 0.5 molar equivalents with respect to one molar equivalent of a polyglycerol group, and more preferably not more than 0.2 molar equivalents. They can be easily produced by adding a specified amount of ethylene oxide and/or propylene oxide in the aforementioned polymerization reaction to perform copolymerization.

As examples of the catalyst for use in hydrosilylation reaction, mention may be made of, for example, platinum-based catalysts, rhodium-based catalysts, and palladium-based catalysts. Among these, the platinum-based catalysts are preferable since an addition polymerization is remarkably accelerated. In particular, platinum microparticles, platinum-supported silica micropowders, platinum-supported activated-carbon, chloroplatinic acid, alcohol solution of chloroplatinic acid, platinum-alkenylsiloxane complex, platinum-olefin complex, and platinum-carbonyl complex can be mentioned as examples, and in particular, platinum-alkenylsiloxane complex is preferable. As examples of the aforementioned alkenylsiloxane, 1,3-divinyl-1,1,3,3-tetramethyldisiloxane; 1,3,5,7-tetramethyl-1,3,5,7-tetravinylcyclotetrasiloxane, alkenylsiloxanes in which a part of the methyl groups of the aforementioned alkenylsiloxanes is substituted with an ethyl group, a phenyl group or the like, and alkenylsiloxanes in which a part of the vinyl groups of the aforementioned alkenylsiloxanes is substituted with an allyl group, a hexenyl group or the like. Among these, 1,3-divinyl-1,1,3,3-tetramethyldisiloxane is preferable since good stability as a complex is exhibited. In addition, in order to improve stability of the aforementioned platinum-alkenylsiloxane complex, an alkenylsiloxane such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3, 3-tetraphenyldisiloxane, 1,3,5,7-tetramethyl-1,3,5,7-tetravinylcyclotetrasiloxane or the like; or an organosiloxane oligomer such as dimethylsiloxane oligomer, or the like is preferably added thereto to form a liquid catalyst. Among these, the alkenylsiloxane is preferable.

In the present invention, a mixture between an oil and a surfactant synthesized in situ in the oil is emulsified to produce an emulsion. Emulsification is carried out by combining the aforementioned mixture with an aqueous medium. The forms of the emulsions may be any one of oil-in-water emulsions, or water-in-oil emulsions. The form of an oil-in-water emulsion is preferable.

As the aforementioned aqueous medium, water or a mixture between water and an organic solvent miscible with water at room temperature (25° C.) (water-miscible organic solvent) can be used. Suitably, not less than 75% by mass of the aforementioned aqueous medium (C) is preferably water, not less than 90% by mass of the aforementioned aqueous medium (C) is preferably water, and the aforementioned aqueous medium (C) is most preferably substantially water. In the case of applying the emulsion according to the present invention to cosmetics or the like, the water is preferably pure. As examples thereof, mention may be made of purified water, ion-exchanged water, and naturally or artificially heat-treated or sterilization-treated mineral water.

As examples of the organic solvents miscible with water at room temperature (25° C.), mention may be made of, for example, monoalcohols having 2 to 6 carbon atoms such as ethanol, isopropanol, and the like; polyols having 2 to 20 carbon atoms, preferably having 2 to 10 carbon atoms, and more preferably having 2 to 6 carbon atoms such as glycerol, propylene glycol, butylene glycol, pentylene glycol, hexylene glycol, dipropylene glycol, and diethylene glycol; glycol ethers, and in particular, those having 3 to 16 carbon atoms, such as ($C_1$-$C_4$) alkyl ethers of mono-, di- or tripropylene glycol, and ($C_1$-$C_4$) alkyl ethers of mono-, di- or triethylene glycol; and mixtures thereof.

The amount of the aqueous medium is not particularly limited. The amount can range from 10 to 10,000 parts by weight, preferably range from 100 to 10,000 parts by weight, and more preferably range from 300 to 10,000 parts by weight with respect to 100 parts by weight of the oil.

The emulsifying means is not particularly limited. For example, a known stirring/mixing apparatus or emulsifier such as a homomixer, paddle mixer, Henschel mixer, homodisper, colloid mixer, propeller stirrer, homogenizer, in-line type continuous emulsifier, ultrasonic emulsifier, vacuum type kneader, colloid mill, combination mixer or the like can be appropriately used.

In the present invention, silicone-based surfactants other than the aforementioned silicone-based surfactant (B) and/or other surfactants such as surfactants having higher hydrocarbon groups and the like can be added to the emulsion. As examples of the aforementioned other surfactants, mention may be made of silicone-based surfactants such as polyether-modified (poly)siloxanes other than those represented by the aforementioned general formula (1), polyglycerol-modified (poly)siloxanes other than those represented by the aforementioned general formula (3), poly(glycidyl ether)-modified (poly)siloxanes other than those represented by the aforementioned general formula (3), poly(glycidyl ether)-polyglycerol-modified (poly)siloxanes other than those represented by the aforementioned general formula (3), and the like; anionic surfactants such as hexylbenzenesulfonic acid, octylbenzenesulfonic acid, decylbenzenesulfonic acid, dodecylbenzenesulfonic acid, cetylbenzenesulfonic acid, myristylbenzenesulfonic acid, sodium salts thereof, and the like; cationic surfactants such as octyl trimethylammonium hydroxide, dodecyl trimethylammonium hydroxide, hexadecyl trimethylammonium hydroxide, octyldimethylbenzylammonium hydroxide, decyl dimethylbenzylammonium hydroxide, dioctadecyl dimethylammonium hydroxide, beef tallow trimethylammonium hydroxide, coconut oil trimethylammonium hydroxide and the like; nonionic surfactants such as polyoxyalkylene alkyl ether, polyoxyalkylene alkylphenol, polyoxyalkylene alkyl ester, polyoxyalkylene sorbitan ester, polyethylene glycol, polypropylene glycol, ethylene oxide adducts of diethylene glycol trimethylnonanol or polyester-based nonionic surfactants; and mixtures of two or more types of the aforementioned surfactants. The addition amount thereof is not limited, but preferably ranges from 0.01 to 50 parts by weight, and more preferably ranges from 0.1 to 30 parts by weight, with respect to 100 parts by weight of the oil.

The timing of adding the aforementioned other surfactants is not particularly limited. The addition is preferably carried out after the surfactant is synthesized in the oil or before the surfactant is synthesized in the oil.

In the present invention, known other components can be added or blended as additives within a range which does not impair the objective of the present invention, before emulsification or after emulsification. As examples of the aforementioned additives, mention may be made of hydrolysable organosilanes, silicas, pH adjustors, preservatives, fungicides, anti-corrosion agents, and thickeners. The aforementioned components may be used alone or in combination with plural types.

In addition, in the present invention, before the surfactant is synthesized, a part of the aqueous medium can be preliminarily mixed in the oil. The amount of the aqueous medium to be preliminarily mixed is not particularly limited. The amount preferably ranges from 0.01 to 50 parts by weight and more preferably ranges from 0.01 to 20 parts by weight with respect to 100 parts by weight of the oil.

EXAMPLES

Hereinafter, the present invention is described in detail with reference to Examples. In the Examples, "parts" indicates parts by weight. The viscosity of the polyorganosiloxane, as well as, the average particle size of the emulsion and stability over time of the emulsion were measured in accordance with the following methods.

Viscosity of Polyorganosiloxane

The viscosity of each polyorganosiloxane was measured at 25° C. by means of a rotational viscometer (Rotor No. 3).

Average Particle Size of Emulsion

The average particle size was measured by means of a laser scattering type submicron particle analyzer (COULTER N4 model, manufactured by Coulter Electronics Co., Ltd.).

Stability Over Time of Emulsion

The produced emulsion, in an amount of 100 g, was placed in a glass bottle with a volume of 100 cc, followed by allowing to stand at 25° C. Visual observation thereof was periodically carried out. In accordance with the period until separation of an oil phase from the emulsion was observed, evaluation was carried out with 6 stages of the following 0 to 5.

0: No emulsion was formed.
1: The oil phase was separated within one week.
2: The oil phase was separated after one week, but within one month.
3: The oil phase was not separated after not less than one month.
4: The oil phase was not separated after not less than two months.
5: The oil phase was not separated after not less than four months.

Example 1

2.6 parts of 2-hydrogen-1,1,1,2,3,3,3-heptamethyltrisiloxane and 9.4 parts of monoalkenyl polyether represented by $CH_2=CHCH_2O(C_2H_4O)_{12}H$ were added to 50 parts of terminal hydroxyl group-containing polyorganosiloxane (viscosity=about 100 mPa·s), followed by mixing them until a uniform mixture was obtained. After the mixture was heated to 70° C., 0.04 parts of a 11% solution of platinum/1,3-divinyl-tetramethyldisiloxane complex was added thereto to react them for 15 minutes at 70° C. Thereby, polyether-modified siloxane No. 1 represented by the following formula (1):

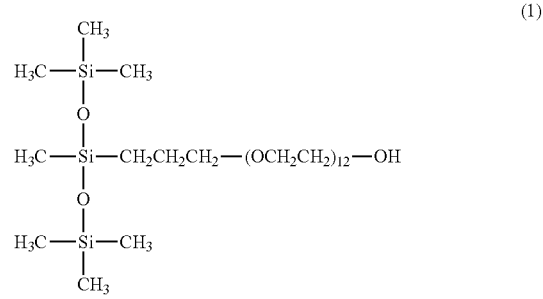

having an HLB of 13.6 was obtained. After cooling the siloxane, 10 parts of water was added thereto, and emulsification was carried out for 15 minutes at about 2,500 rpm by means of a T. K homodisper (manufactured by Tokushu Kika Kogyo Co., Ltd.). Subsequently, 27.96 parts of water was added thereto, and diluted. Thereby, an emulsion was obtained. The particle size of the obtained emulsion was about 120 nm. The emulsion was stable for not less than 2 months.

Example 2

An emulsion was obtained in the same manner as described in Example 1, with the exception of using 50 parts of a terminal trimethylsilyl group-containing polyorganosiloxane (viscosity=about 100 mPa·s) instead of 50 parts of the terminal hydroxyl group-containing polyorganosiloxane (viscosity=about 100 mPa·s) used in Example 1. The obtained emulsion had a particle size of 250 nm and was stable for not less than 2 months.

Example 3

An emulsion was obtained in the same manner as described in Example 1, with the exception of using 50 parts of a terminal hydroxyl group-containing polyorganosiloxane (viscosity=about 2,300 mPa·s) instead of 50 parts of the terminal hydroxyl group-containing polyorganosiloxane (viscosity=about 100 mPa·s) used in Example 1. The obtained emulsion had a particle size of 160 nm and was stable for not less than 2 months.

Example 4

An emulsion was obtained in the same manner as described in Example 1, with the exception of using 8.8 parts of $CH_2=CHCH_2O(C_2H_4O)_{13}CH_3$, instead of 9.4 parts of the monoalkenyl polyether represented by $CH_2=CHCH_2O(C_2H_4O)_{12}H$ in Example 1, to produce polyether-modified siloxane No. 2 represented by the following formula (2):

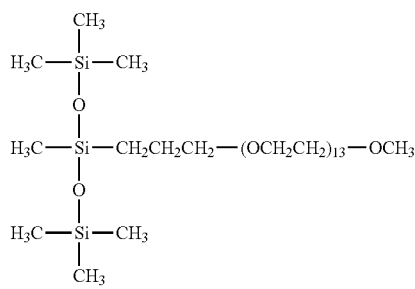

using 14 parts of water for phase inversion, and using 24.56 parts of water for dilution. The obtained emulsion had a particle size of 150 nm and was stable for not less than 2 months.

Example 5

An emulsion was obtained in the same manner as described in Example 1, with the exception of using 7.7 parts of $CH_2=CHCH_2O(C_2H_4O)_7H$, instead of 9.4 parts of the monoalkenyl polyether represented by $CH_2=CHCH_2O(C_2H_4O)_{12}H$ in Example 1, using 3.4 parts of 2-hydrogen-1,1,1,2,3,3,3-heptamethyltrisiloxane to produce polyether-modified siloxane No. 3 represented by the following formula (3):

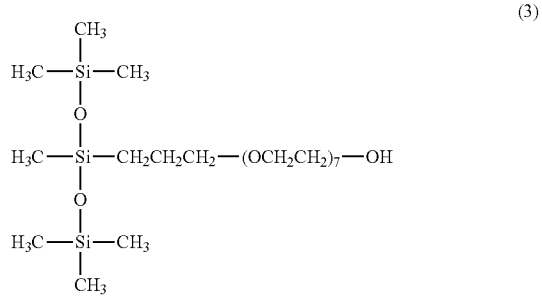

using 10 parts of water for phase inversion, and using 28.86 parts of water for dilution. The obtained emulsion had a particle size of 181 nm and was stable for one month.

Example 6

An emulsion was obtained in the same manner as described in Example 1, with the exception of using 50 parts of a terminal hydroxyl group-containing polyorganosiloxane (viscosity=about 500 mPa·s) instead of 50 parts of the terminal hydroxyl group-containing polyorganosiloxane (viscosity=about 100 mPa·s) used in Example 1, using 7.5 parts of water for phase inversion, and using 30.46 parts of water for dilution. The obtained emulsion had a particle size of 281 nm and was stable for not less than 2 months.

Example 7

2.6 parts of 2-hydrogen-1,1,1,2,3,3,3-heptamethyltrisiloxane and 9.4 parts of a monoalkenyl polyether represented by $CH_2=CHCH_2O(C_2H_4O)_{12}H$ were added to 50 parts of a terminal hydroxyl group-containing polyorganosiloxane (viscosity=about 100 mPa·s), followed by mixing them until a uniform mixture was obtained. After the mixture was heated to 70° C., 0.04 parts of a 11% solution of platinum/1,3-divinyl-tetramethyldisiloxane complex was added thereto. The mixture was reacted for 15 minutes at 70° C. Thereby, polyether-modified siloxane No. 1 with an HLB of 13.6 was obtained. After cooling the product, 10 parts of water was added thereto and emulsification was carried out by means of a colloid mill. Subsequently, 27.96 parts of water was added thereto to obtain an emulsion by dilution. The particle size of the obtained emulsion was about 114 nm and the emulsion was stable for not less than 2 months.

Example 8

3.25 parts of a silicon atom-bonding hydrogen atom-containing siloxane represented by $Me_3SiO-(SiMe_2O)_{1.9}-SiHMeO-SiMe_3$ wherein Me represents a $-CH_3$ group and 7.9 parts of a monoalkenyl polyether represented by $CH_2=CHCH_2O(C_2H_4O)_{13}CH_3$ were added to 50 parts of a terminal hydroxyl group-containing polyorganosiloxane (viscosity=about 100 mPa·s), followed by mixing them until a uniform mixture was obtained. After the mixture was heated to 70° C., 0.04 parts of a 11% solution of platinum/1,3-divinyl-tetramethyldisiloxane complex was added thereto. The mixture was reacted for 15 minutes at 70° C. Thereby, polyether-modified siloxane No. 4 represented by the following average formula (4):

(4)

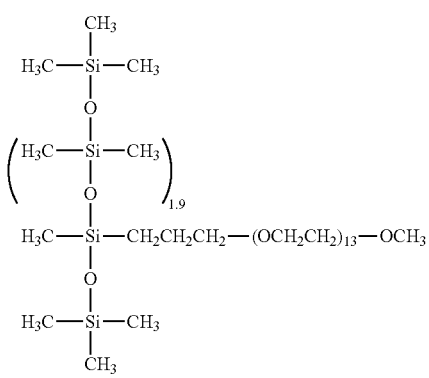

was obtained. After cooling the product, 10 parts of water was added thereto and emulsification was carried out for 15 minutes at about 2,500 rpm by means of a T.K homodisper. Subsequently, 28.61 parts of water was added thereto to obtain an emulsion by dilution. The particle size of the obtained emulsion was about 216 nm and the emulsion was stable for one week.

Example 9

1.45 parts of 2-hydrogen-1,1,1,2,3,3,3-heptamethyltrisiloxane and 10.2 parts of a terminal allyl group-containing polyglycidyl methyl ether represented by the following formula (5):

(5)

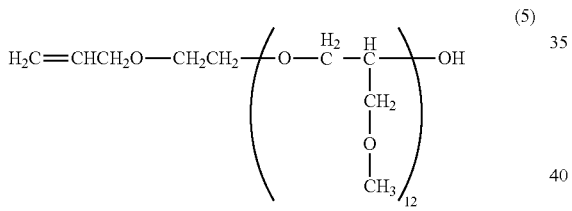

were added to 50 parts of a terminal hydroxyl group-containing polyorganosiloxane (viscosity=about 100 mPa·s), followed by mixing them until a uniform mixture was obtained. After the mixture was heated to 70° C., 0.04 parts of a 11% solution of platinum/1,3-divinyl-tetramethyldisiloxane complex was added thereto. The mixture was reacted for 15 minutes at 70° C. Thereby, polyglycidyl-modified siloxane No. 5 represented by the following formula (6):

(6)

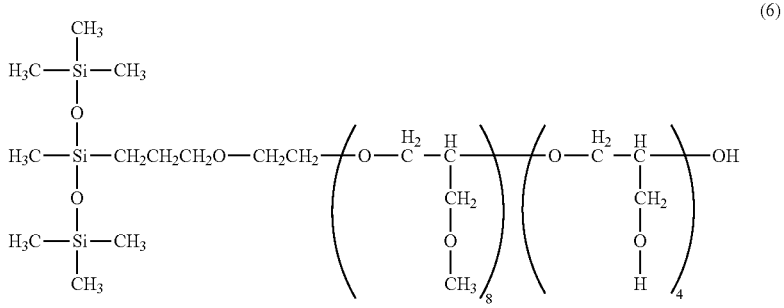

was obtained. After cooling the product, 15 parts of water was added thereto and emulsification was carried out for 15 minutes at about 2,500 rpm by means of a T.K homodisper. Subsequently, 23.31 parts of water was added thereto to obtain an emulsion by dilution. The particle size of the obtained emulsion was about 278 nm and the emulsion was stable for not less than 4 months.

Example 10

1.5 parts of 2-hydrogen-1,1,1,2,3,3,3-heptamethyltrisiloxane and 10.2 parts of a terminal allyl group-containing polyglycidyl methyl ether-polyglycidol represented by the following formula (7):

(7)

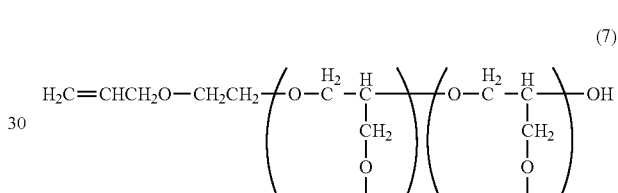

were added to 50 parts of a terminal hydroxyl group-containing polyorganosiloxane (viscosity=about 100 mPa·s), followed by mixing them until a uniform mixture was obtained. After the mixture was heated to 70° C., 0.04 parts of a 11% solution of platinum/1,3-divinyl-tetramethyldisiloxane complex was added thereto. The mixture was reacted for 15 minutes at 70° C. Thereby, polyglycidyl-modified siloxane No. 6 represented by the following formula (8):

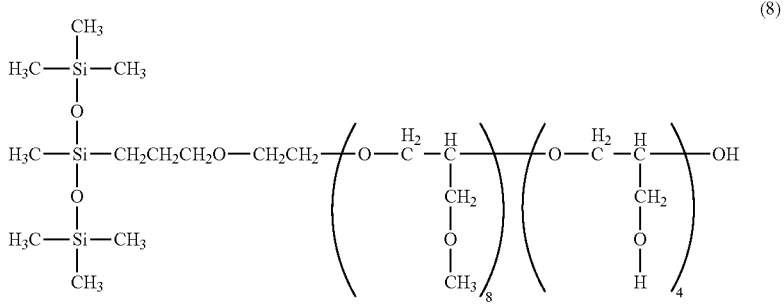

(8)

was obtained. After cooling the product, 20 parts of water was added thereto and emulsification was carried out for 15 minutes at about 2,500 rpm by means of a T.K homodisper. Subsequently, 18.26 parts of water was added thereto to obtain an emulsion by dilution. The particle size of the obtained emulsion was about 584 nm and the emulsion was stable for not less than 2 months.

Comparative Example 1

2.6 parts of 2-hydrogen-1,1,1,2,3,3,3-heptamethyltrisiloxane and 9.4 parts of a monoalkenyl polyether represented by $CH_2=CHCH_2O(C_2H_4O)_{12}H$ were mixed, followed by heating the mixture to 70° C. 0.04 parts of a 11% solution of platinum/1,3-divinyl-tetramethyldisiloxane complex was added thereto. The mixture was reacted for 15 minutes at 70° C. Thereby, the same polyether-modified siloxane as described in Example 1 was obtained. 50 parts of a terminal hydroxyl group-containing polydimethylsilicone (viscosity=about 100 mPa·s) was added thereto, followed by adding 10 parts of water. Although emulsification was attempted for 15 minutes at about 2,500 rpm by means of a T.K homodisper, the mixture could not be emulsified.

Comparative Example 2

In the same manner as described in Comparative Example 1, a polyether-modified siloxane was obtained. Subsequently, 50 parts of a terminal hydroxyl group-containing polydimethylsiloxane (viscosity=about 100 mPa·s) was added thereto. 15 parts of water for phase inversion was added thereto. The mixture was emulsified for 15 minutes at about 2,500 rpm by means of a T.K homodisper. Subsequently, the emulsion was diluted with 22.96 parts of water. The particle size of the obtained emulsion was 300 nm. Separation occurred after 4 days.

Comparative Example 3

9.5 parts of a polyoxyethylene (7 mol) isodecyl ether was added to 50 parts of a terminal hydroxyl group-containing polydimethylsiloxane (viscosity=about 100 mPa·s), followed by stirring them until a uniform mixture was obtained. 10 parts of water was added thereto. Although emulsification was attempted for 15 minutes at about 2,500 rpm by means of a T.K homodisper, the mixture could not be emulsified.

Comparative Example 4

9.5 parts of a polyoxyethylene (7 mol) isodecyl ether was added to 50 parts of a terminal hydroxyl group-containing polydimethylsiloxane (viscosity=about 500 mPa·s), followed by stirring them until a uniform mixture was obtained. 7.5 parts of water was added thereto. Although emulsification was attempted for 15 minutes at about 2,500 rpm by means of a T.K homodisper, the mixture could not be emulsified.

Comparative Example 5

3.25 parts of a silicon atom-bonding hydrogen atom-containing siloxane represented by $Me_3SiO—(SiMe_2O)_{1.9}—Si-HMeO—SiMe_3$, wherein Me represents a $—CH_3$ group, and 7.9 parts of a monoalkenyl polyether represented by $CH_2=CHCH_2O(C_2H_4O)_{13}CH_3$ were added, followed by mixing them. After the mixture was heated to 70° C., 0.04 parts of a 11% solution of platinum/1,3-divinyl-tetramethyl-disiloxane complex was added thereto. The mixture was reacted for 15 minutes at 70° C. Thereby, 9.0 parts of the same polyether-modified siloxane as described in Example 8 was obtained. After 50 parts of a terminal hydroxyl group-containing polydimethylsilicone (viscosity=about 100 mPa·s) was added thereto, 10 parts of water was added thereto. Although emulsification was attempted for 15 minutes at about 2,500 rpm by means of a T.K homodisper, the mixture could not be emulsified.

Compositions of Example 1 to Example 10, emulsification means, and relationship between the average particle size of the obtained emulsion and stability are shown in Table 1 and Table 2. In addition, compositions of Comparative Example 1 to Comparative Example 5, emulsification means, and relationship between the average particle size of the obtained emulsion and stability are shown in Table 3. In the tables, "parts" indicates parts by weight.

TABLE 1

| Example | 1 | 2 | 3 | 4 | 5 |
|---|---|---|---|---|---|
| Terminal hydroxyl group-containing polyorganosiloxane (viscosity = 100 mPa · s) | 50 | — | — | 50 | 50 |
| Terminal trimethylsilyl group-containing polyorganosiloxane (viscosity = 100 mPa · s) | — | 50 | — | — | — |
| Terminal hydroxyl group-containing polyorganosiloxane (viscosity = 2,300 mPa · s) | — | — | 50 | — | — |
| Polyether-modified silicone (synthesized in polyorganosiloxane) | No. 1 | No. 1 | No. 1 | No. 2 | No. 3 |
| Water for phase inversion | 10 | 10 | 10 | 10 | 10 |
| Water for dilution | 27.96 | 27.96 | 27.96 | 27.96 | 27.96 |
| Average particle size (nm) | 120 | 250 | 160 | 150 | 181 |
| Stability over time | 4 | 4 | 4 | 4 | 3 |

TABLE 2

| Example | 6 | 7 | 8 | 9 | 10 |
|---|---|---|---|---|---|
| Terminal hydroxyl group-containing polyorganosiloxane (viscosity = 100 mPa·s) | — | 50 | 50 | 50 | 50 |
| Terminal hydroxyl group-containing polyorganosiloxane (viscosity = 500 mPa·s) | 50 | — | — | — | — |
| Polyether-modified silicone (synthesized in polyorganosiloxane) | No. 1 | No. 1 | No. 4 | No. 5 | No. 6 |
| Water for phase inversion | 7.5 | 10 | 10 | 10 | 10 |
| Water for dilution | 30.46 | 27.96 | 28.61 | 23.31 | 18.26 |
| Average particle size (nm) | 281 | 114 | 216 | 278 | 584 |
| Stability over time | 4 | 4 | 2 | 5 | 4 |

TABLE 3

| Comparative Example | 1 | 2 | 3 | 4 | 5 |
|---|---|---|---|---|---|
| Terminal hydroxyl group-containing polyorganosiloxane (viscosity = 100 mPa·s) | 50 | 50 | 50 | — | 50 |
| Terminal hydroxyl group-containing polyorganosiloxane (viscosity = 500 mPa·s) | — | — | — | 50 | — |
| Polyether-modified silicone (which was not synthesized in polyorganosiloxane) | No. 1 | No. 1 | — | — | No. 4 |
| Polyoxyethylene (7 mol) isodecyl ether | — | — | 9.5 | 9.5 | — |
| Water for phase inversion | 10 | 15 | 10 | 7.5 | 10 |
| Water for dilution | — | 22.96 | — | — | — |
| Average particle size (nm) | — | 300 | — | — | — |
| Stability over time | 0 | 1 | 0 | 0 | 0 |

As shown in Table 1 and Table 2, in the case of synthesizing the polyether-modified silicone corresponding to silicone-based surfactant (B) in polyorganosiloxane (A), specified water for phase inversion was added and an emulsification treatment was carried out by means of a T.K homodisper or a colloid mill. Thereby, an emulsion exhibiting superior stability over time could be obtained. In particular, when a polyether-modified silicone was synthesized using 2-hydrogen-1,1,1,2,3,3,3-heptamethyltrisiloxane as a raw material in the case of synthesizing component (B), oil phase separation could not be observed in the obtained emulsions (Examples 1 to 7, 9 and 10) after the emulsions were allowed to stand for one or more months at 25° C. On the other hand, as shown in Table 3, if synthesis of component (B) was not carried out in polyorganosiloxane (A), or if a nonionic surfactant was separately added as component (B), emulsification could not occur or only emulsions exhibiting inferior stability over time, as compared with the examples were obtained even if a specified water for phase inversion was added and an emulsification treatment was carried out by means of a T.K homodisper.

INDUSTRIAL APPLICABILITY

The emulsions produced by the present invention are useful as water repellent agents, mold releasing agents, lubricants, fiber treatment agents, leather treatment agents, artificial leather treatment agents, cosmetic additives, cosmetics, glazing agents, defoaming agents, surface treatment agents, coating agents, or the like. In particular, the emulsions are preferably used as additives for use in cosmetics or cosmetics as they are.

The invention claimed is:

1. A method for producing an emulsion characterized by emulsifying a mixture of an oil and a surfactant, obtained by synthesizing the surfactant in the oil, wherein the oil is an organopolysiloxane.

2. The method for producing an emulsion according to claim 1, wherein the surfactant is a silicone-based surfactant (B).

3. The method for producing an emulsion according to claim 2, wherein the silicone-based surfactant (B) is represented by general formula (1):

$$R^2{}_3SiO(R^1{}_2SiO)_m(R^1XSiO)_nSiR^2{}_3 \quad (1)$$

wherein each $R^1$ independently represents a hydrogen atom or a substituted or unsubstituted monovalent hydrocarbon group;

each X independently represents a group represented by general formula (2):

$$-C_aH_{2a}(OC_2H_4)_b(OC_3H_6)_c-OA \quad (2)$$

wherein

A represents a hydrogen atom, a substituted or unsubstituted monovalent hydrocarbon group, or an organic group represented by $-(CO)-R^3$ in which $R^3$ represents a substituted or unsubstituted monovalent hydrocarbon group;

$(OC_2H_4)$ and $(OC_3H_6)$ are arranged in any one of a random type, a block type, an alternative type, or a mixed type thereof;

a ranges from 2 to 15;

b ranges from 0 to 100;

c ranges from 0 to 100, m ranges from 0 to 50;

n ranges from 0 to 20; and $R^2$ represents $R^1$ or X, with the proviso that when n is 0, at least one $R^2$ represents X.

4. The method for producing an emulsion according to claim 3, wherein m ranges from 0 to 6 and n ranges from 0 to 3.

5. The method for producing an emulsion according to claim 2, wherein the silicone-based surfactant (B) is represented by general formula (3):

$$R^5{}_3SiO(R^1{}_2SiO)_m(R^4YSiO)_nSiR^5{}_3 \quad (3)$$

wherein each $R^4$ independently represents a hydrogen atom or a substituted or unsubstituted monovalent hydrocarbon group;

Y represents a group represented by general formula (4):

$$-C_dH_{2d}(OC_2H_4)_e(OC_3H_6)_f-O-Z^1{}_gZ^2{}_h-B \quad (4)$$

wherein

B represents a hydrogen atom, a substituted or unsubstituted monovalent hydrocarbon group, or an organic group represented by $-(CO)-R^3$ in which $R^3$ represents a substituted or unsubstituted monovalent hydrocarbon group;

$Z^1$ represents a divalent group represented by general formula (5):

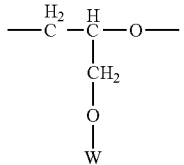
(5)

wherein
W represents a hydrogen atom or a substituted or unsubstituted monovalent hydrocarbon group having no aliphatic unsaturated bond;
$Z^2$ represents a divalent group represented by general formula (6):

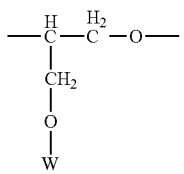
(6)

wherein
W is as described above;
$(OC_2H_4)$ and $(OC_3H_6)$, as well as, $Z^1$ and $Z^2$ are arranged in any one of a random type, a block type, an alternative type, or a mixed type thereof;
d ranges from 2 to 20;
e ranges from 0 to 100;
f ranges from 0 to 100;
g ranges from 0 to 200;
h ranges from 0 to 200; and $1 \le g+h$,
m' ranges from 0 to 50;
n' ranges from 0 to 20; and
$R^5$ represents $R^4$ or Y, with the proviso that when n' is 0, at least one $R^5$ represents Y.

6. The method for producing an emulsion according to claim 5, wherein m' ranges from 0 to 6 and n' ranges from 0 to 3.

7. The method for producing an emulsion according to claim 2, wherein the silicone-based surfactant (B) is produced by subjecting a silicon atom-bonding hydrogen atom-containing siloxane and a terminal double bond-containing compound to a hydrosilylation reaction in the presence of a catalyst for use in the hydrosilylation reaction.

8. The method for producing an emulsion according to claim 1, wherein the polyorganosiloxane (A) has a viscosity ranging from 50 to 3,000 mPa·s at 25° C.

* * * * *